(12) United States Patent
Mikolov et al.

(10) Patent No.: US 11,809,824 B1
(45) Date of Patent: *Nov. 7, 2023

(54) COMPUTING NUMERIC REPRESENTATIONS OF WORDS IN A HIGH-DIMENSIONAL SPACE

(71) Applicant: Google LLC, Mountain View, CA (US)

(72) Inventors: Tomas Mikolov, Jersey City, NJ (US); Kai Chen, San Bruno, CA (US); Gregory S. Corrado, San Francisco, CA (US); Jeffrey A. Dean, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 237 days.

This patent is subject to a terminal disclaimer.

(21) Appl. No.: 17/175,550

(22) Filed: Feb. 12, 2021

Related U.S. Application Data

(63) Continuation of application No. 16/363,460, filed on Mar. 25, 2019, now Pat. No. 10,922,488, which is a continuation of application No. 15/682,374, filed on Aug. 21, 2017, now Pat. No. 10,241,997, which is a continuation of application No. 14/715,421, filed on May 18, 2015, now Pat. No. 9,740,680, which is a (Continued)

(51) Int. Cl.
| | |
|---|---|
| *G06F 40/30* | (2020.01) |
| *G06F 40/279* | (2020.01) |
| *G06N 20/00* | (2019.01) |
| *G10L 15/06* | (2013.01) |

(52) U.S. Cl.
CPC ............ *G06F 40/279* (2020.01); *G06F 40/30* (2020.01); *G06N 20/00* (2019.01); *G10L 15/06* (2013.01)

(58) Field of Classification Search
CPC .......... G06F 40/30; G06F 40/20; G06F 16/243
See application file for complete search history.

(56) References Cited

U.S. PATENT DOCUMENTS

| | | |
|---|---|---|
| 5,231,670 A | 7/1993 | Goldhor |
| 5,425,128 A | 6/1995 | Morrison |

(Continued)

OTHER PUBLICATIONS

Bengio and LeCun, "Scaling learning algorithms towards AI," Large-Scale Kernel Machines, MIT Press, 2007, 41 pages.

(Continued)

*Primary Examiner* — Daniel Abebe
(74) *Attorney, Agent, or Firm* — Fish & Richardson P.C.

(57) ABSTRACT

Methods, systems, and apparatus, including computer programs encoded on computer storage media, for computing numeric representations of words. One of the methods includes obtaining a set of training data, wherein the set of training data comprises sequences of words; training a classifier and an embedding function on the set of training data, wherein training the embedding function comprises obtained trained values of the embedding function parameters; processing each word in the vocabulary using the embedding function in accordance with the trained values of the embedding function parameters to generate a respective numerical representation of each word in the vocabulary in the high-dimensional space; and associating each word in the vocabulary with the respective numeric representation of the word in the high-dimensional space.

16 Claims, 5 Drawing Sheets

Related U.S. Application Data continuation of application No. 13/841,640, filed on Mar. 15, 2013, now Pat. No. 9,037,464.

(60) Provisional application No. 61/752,911, filed on Jan. 15, 2013.

(56) References Cited

U.S. PATENT DOCUMENTS

| | | | |
|---|---|---|---|
| 5,454,062 A | | 9/1995 | La Rue |
| 5,651,096 A | | 7/1997 | Pallakoff |
| 5,675,819 A | * | 10/1997 | Schuetze ............... G06F 16/334 |
| | | | 715/205 |
| 5,909,666 A | | 6/1999 | Gould et al. |
| 5,920,836 A | | 7/1999 | Gould et al. |
| 5,960,394 A | | 9/1999 | Gould et al. |
| 6,092,043 A | | 7/2000 | Squires et al. |
| 6,507,815 B1 | | 1/2003 | Yamamoto |
| 6,721,702 B2 | | 4/2004 | Schneider |
| 7,406,417 B1 | | 7/2008 | Hain |
| 8,498,986 B1 | * | 7/2013 | Botros ................. G06F 16/285 |
| | | | 707/737 |
| 8,566,102 B1 | | 10/2013 | Bangalore et al. |
| 10,521,466 B2 | | 12/2019 | Bellegarda et al. |
| 2013/0262467 A1 | | 10/2013 | Zhang et al. |
| 2019/0043483 A1 | | 2/2019 | Chakraborty et al. |

OTHER PUBLICATIONS

Bengio et al., "A neural probabilistic language model," Journal of Machine Learning Research, 2003, 3:1137-1155.

Brants et al., "Large language models in machine translation," Proceedings of the Joint Conference on Empirical Methods in Natural Language Processing and Computational Language Learning, 2007, 10 pages.

Collobert and Weston, "A Unified Architecture for Natural Language Processing: Deep Neural Networks with Multitask Learning," International Conference on Machine Learning, ICML, 2008, 8 pages.

Collobert et al., "Natural Language Processing (Almost) from Scratch," Journal of Machine Learning Research, 2011, 12:2493-2537.

Dean et al., "Large Scale Distributed Deep Networks," Neural Information Processing Systems Conference, 2012, 9 pages.

Elman, "Finding Structure in Time," Cognitive Science, 1990, 179-211.

Huang et al., "Improving Word Representations via Global Context and Multiple Word Prototypes," Proc. Association for Computational Linguistics, 2012, 10 pages.

Mikolov and Zweig, "Linguistic Regularities in Continuous Space Word Representations," submitted to NAACL HLT, 2012, 6 pages.

Mikolov et al., "Empirical Evaluation and Combination of Advanced Language Modeling Techniques," Proceedings of Interspeech, 2011, 4 pages.

Mikolov et al., "Extensions of recurrent neural network language model," IEEE International Conference on Acoustics, Speech and Signal Processing (ICASSP), May 2011, pp. 5528-5531.

Mikolov et al., "Neural network based language models for highly inflective languages," Proc. ICASSP, 2009, 4 pages.

Mikolov et al., "Recurrent neural network based language model," Proceedings of Interspeech, 2010, 4 pages.

Mikolov et al., "Strategies for Training Large Scale Neural Network Language Models," Proc. Automatic Speech Recognition and Understanding, 2011, 6 pages.

Mikolov, "RNNLM Toolkit," Faculty of Information Technology (FIT) of Brno University of Technology [online], 2010-2012 [retrieved on Jun. 16, 2014], Retrieved from the Internet: <URL: http://www.fit.vutbr.cz/~imikolov/mnlm/>, 3 pages.

Mikolov, "Statistical Language Models based on Neural Networks," PhD thesis, Brno Univer-sity of Technology, 2012, 133 pages.

Mnih and Hinton, "A Scalable Hierarchical Distributed Language Model," Advances in Neural Information Processing Systems 21, MIT Press, 2009, 8 pages.

Morin and Bengio, "Hierarchical Probabilistic Neural Network Language Model," AISTATS, 2005, 7 pages.

Rumelhart et al., "Learning representations by back-propagating errors," Nature, 1986, 323:533-536.

Turian et al., "MetaOptimize / projects / wordreprs /" Metaoptimize.com [online], captured on Mar. 7, 2012. Retrieved from the Internet using the Wayback Machine: < URL: http://web.archive.org/web/20120307230641/http://metaoptimize.com/projects/wordreprs>, 2 pages.

Turlan et al., "Word Representations: A Simple and General Method for Semi-Supervised Learning," Proc. Association for Computational Linguistics, 2010, 384-394.

Turney, "Measuring Semantic Similarity by Latent Relational Analysis," Proc. International Joint Conference on Artificial Intelligence, 2005, 6 pages.

Zweig and Burges, "The Microsoft Research Sentence Completion Challenge," Microsoft Research Technical Report MSR-TR-2011-129, Feb. 2011, 7 pages.

\* cited by examiner

COMPUTING NUMERIC REPRESENTATIONS OF WORDS IN A HIGH-DIMENSIONAL SPACE

CROSS-REFERENCE TO RELATED APPLICATIONS

This application is a continuation of U.S. application Ser. No. 16/363,460, filed on Mar. 25, 2019, which is a continuation of U.S. application Ser. No. 15/682,374, filed on Aug. 21, 2017 (now U.S. Pat. No. 10,241,997), which is a continuation of U.S. application Ser. No. 14/715,421, filed on May 18, 2015 (now U.S. Pat. No. 9,740,680), which is a continuation of U.S. application Ser. No. 13/841,640, filed on Mar. 15, 2013 (now U.S. Pat. No. 9,037,464), which claims the benefit of priority under 35 U.S.C. § 119(e) of U.S. Provisional Application No. 61/752,911, filed Jan. 15, 2013. The disclosures of the prior applications are considered part of and are incorporated by reference in the disclosure of this application.

BACKGROUND

This specification relates to computing numeric representations of words.

In order to predict one or more unknown words in a sequence of words, e.g., in a sentence or a phrase, some systems convert one or more of the words in the sequence into numeric representations.

SUMMARY

In general, one innovative aspect of the subject matter described in this specification can be embodied in a system that includes a classifier implemented in one or more computers, comprising: an embedding function layer configured to receive an input comprising a plurality of words that surround an unknown word in a sequence of words and map the plurality of words into a numeric representation in a high-dimensional space; and a classifier layer configured to process the numeric representation of the input to generate a respective word score for each word in a pre-determined set of words, wherein each of the respective word scores represents a predicted likelihood that the corresponding word is the unknown word; and instructions to process each word in a vocabulary of words using the embedding function layer to obtain a respective numeric representation of each word in the vocabulary in the high-dimensional space and to associate each word in the vocabulary with the respective numeric representation of the word in the high-dimensional space.

These and other embodiments can each optionally include one or more of the following features. The numeric representations can be continuous representations represented using floating-point numbers. Positions of representations in the high-dimensional space can reflect semantic similarities, syntactic similarities, or both, between words represented by the representations. The embedding layer can map each of the plurality of words to a respective floating point vector and outputs a single merged vector that is a combination of the respective floating point vectors.

In general, one innovative aspect of the subject matter described in this specification can be embodied in a system that includes a classifier implemented in one or more computers, comprising: an embedding function layer configured to receive an input comprising an input word and map the input word into a numeric representation in a high-dimensional space, and a plurality of classifiers, wherein each of the classifiers corresponds to a respective position surrounding the input word in a sequence of words, and wherein each of the plurality of classifiers is configured to: process the numeric representation of the input word to generate a respective word score for each word in a pre-determined set of words, wherein each of the respective word scores represents a predicted likelihood that the corresponding word will be found in the corresponding position relative to the input word; and instructions to process each word in a vocabulary of words using the embedding function layer to obtain a respective numeric representation of each word in the vocabulary in the high-dimensional space and to associate each word in the vocabulary with the respective numeric representation of the word in the high-dimensional space.

These and other embodiments can each optionally include one or more of the following features. The numeric representations can be continuous representations represented using floating-point numbers. Positions of representations in the high-dimensional space can reflect semantic similarities, syntactic similarities, or both, between words represented by the representations. The embedding layer can map the input word to a floating point vector.

In general, another innovative aspect of the subject matter described in this specification can be embodied in methods that include the actions of obtaining a set of training data, wherein the set of training data comprises sequences of words; training a plurality of classifiers and an embedding function on the set of training data, wherein the embedding function receives an input word and maps the input word to a numeric representation in the high-dimensional space in accordance with a set of embedding function parameters, wherein each of the classifiers corresponds to a respective position surrounding the input word in a sequence of words, and wherein each of the classifiers processes the numeric representation of the input word to generate a respective word score for each word in a pre-determined set of words, wherein each of the respective word scores represents a predicted likelihood that the corresponding word will be found in the corresponding position relative to the input word, and wherein training the embedding function comprises obtaining trained values of the embedding function parameters; processing each word in the vocabulary using the embedding function in accordance with the trained values of the embedding function parameters to generate a respective numerical representation of each word in the vocabulary; and associating each word in the vocabulary with the respective numeric representation of the word in the high-dimensional space.

Other embodiments of this aspect include corresponding systems, apparatus, and computer programs, configured to perform the actions of the methods, encoded on computer storage devices.

These and other embodiments can each optionally include one or more of the following features. The numeric representations can be continuous representations represented using floating-point numbers. Positions of representations in the high-dimensional space can reflect semantic similarities, syntactic similarities, or both, between words represented by the representations. The embedding layer can map the input word to a floating point vector.

In general, another innovative aspect of the subject matter described in this specification can be embodied in methods that include the actions of obtaining a set of training data, wherein the set of training data comprises sequences of words; training a classifier and an embedding function on the set of training data, wherein the embedding function receives a plurality of words surrounding an unknown word in a sequence of words and maps the plurality of words into a numeric representation in accordance with a set of embedding function parameters, wherein the classifier processes the numeric representation of the sequence of words to generate a respective word score for each word in a predetermined set of words, and wherein each of the respective word scores measure a predicted likelihood that the corresponding word is the unknown word, and wherein training the embedding function comprises obtained trained values of the embedding function parameters; processing each word in the vocabulary using the embedding function in accordance with the trained values of the embedding function parameters to generate a respective numerical representation of each word in the vocabulary in the high-dimensional space; and associating each word in the vocabulary with the respective numeric representation of the word in the high-dimensional space.

Other embodiments of this aspect include corresponding systems, apparatus, and computer programs, configured to perform the actions of the methods, encoded on computer storage devices.

These and other embodiments can each optionally include one or more of the following features. The numeric representations can be continuous representations represented using floating-point numbers. Positions of representations in the high-dimensional space can reflect semantic similarities, syntactic similarities, or both, between words represented by the representations. The embedding layer can map each of the plurality of words to a respective floating point vector and outputs a single merged vector that is a combination of the respective floating point vectors.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Particular embodiments of the subject matter described in this specification can be implemented so as to realize one or more of the following advantages. Unknown words in sequences of words can be effectively predicted if the surrounding words are known. Words surrounding a known word in a sequence of words can be effectively predicted. Numerical representations of words in a vocabulary of words can be easily and effectively generated. The numerical representations can reveal semantic and syntactic similarities and relationships between the words that they represent.

By using a word prediction system having a two-layer architecture and by parallelizing the training process, the word prediction system can be can be effectively trained on very large word corpuses, e.g., corpuses that contain on the order of 200 billion words, resulting in higher quality numeric representations than those that are obtained by training systems on relatively smaller word corpuses. Further, words can be represented in very high-dimensional spaces, e.g., spaces that that have on the order of 1000 dimensions, resulting in higher quality representations than when words are represented in relatively lower-dimensional spaces. Additionally, the time required to train the word prediction system can be greatly reduced.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes systems that can be used to generate numeric representations of words in a high-dimensional space. The numeric representations are continuous high-dimensional representations, i.e., words are represented by floating point numbers in a high-dimensional space, e.g., as high-dimensional vectors of floating point numbers. The systems can be trained so that positions of the representations in the high-dimensional space generated by the systems reflect semantic and syntactic similarities between the words they represent.

Figure 1:
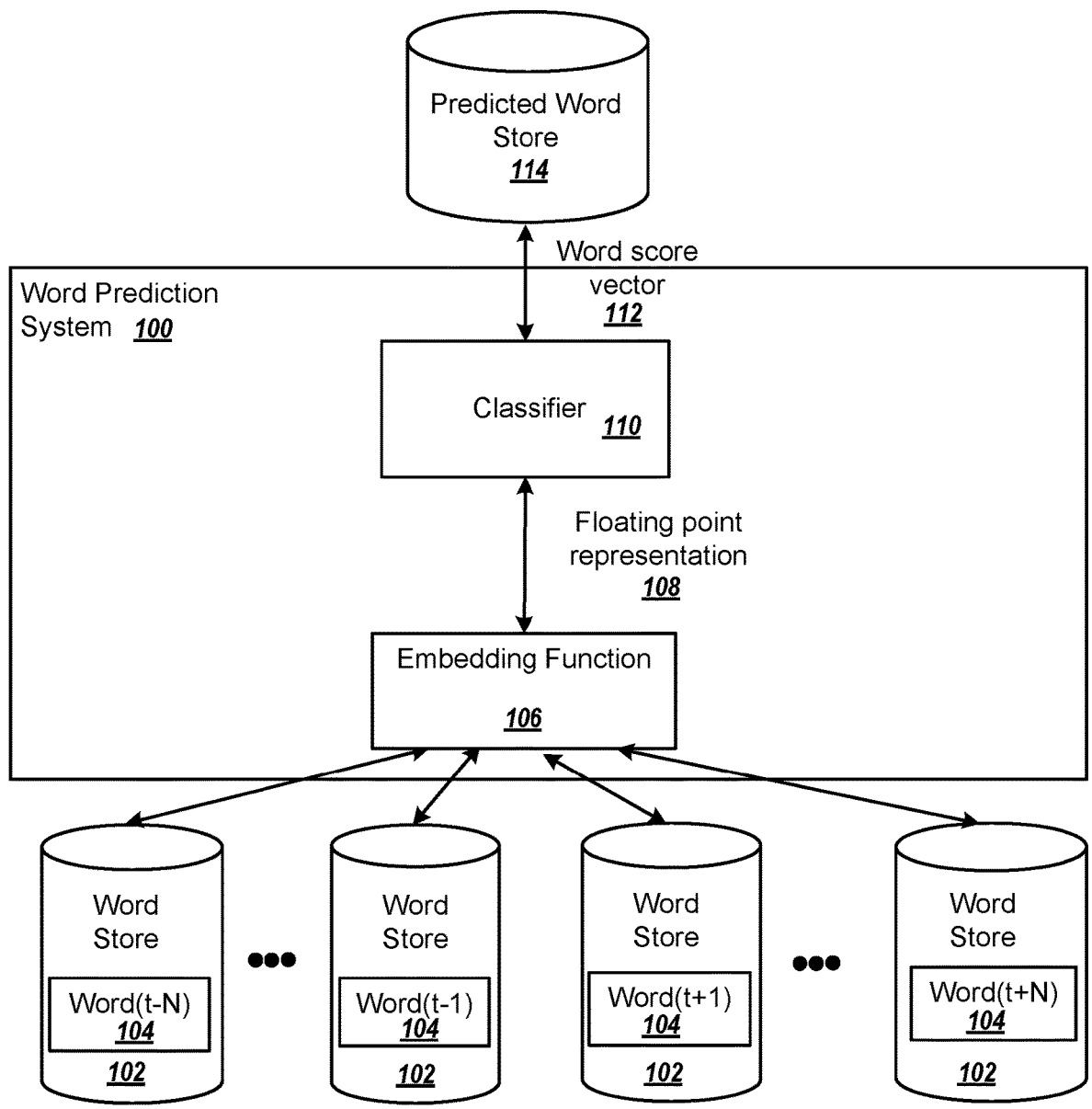
FIG. 1 is a block diagram of an example word prediction system.

FIG. 1 is a block diagram of an example word prediction system 100. The word prediction system 100 is an example of a system implemented as computer programs on one or more computers in one or more locations, in which the systems, components, and techniques described below can be implemented.

The word prediction system 100 receives inputs and generates a predicted output based on the received inputs. In particular, the inputs are words that surround an unknown word in a sequence of words, e.g., in a phrase or a sentence, and the predicted output is a respective score for each of a predetermined set of words. In some implementations, the input words are tokenized before being received by the system, e.g., so that known compounds, e.g., "New York City" and other entity names, are treated as a single word by the system. Each score generated for each of the words is a prediction of how likely it is that the corresponding word is the unknown word. For example, for a sequence of words $X_1X_2X_3$, where the words $X_1$ and $X_3$ are known and the word $X_2$ is not, the word prediction system 100 can receive as an input the words $X_1$ and $X_3$ and generate a score for each of the predetermined set of words that is a prediction of how likely it is that the corresponding word is the unknown word $X_2$.

For example, the word prediction system 100 can receive a sequence of words 104 from respective word data stores 102. Each word data store 102 stores words in a respective position in a sequence of words that includes an unknown word. For example, if a word at position t in a sequence of words is unknown, the word data stores 102 may store words at position $t-N, \ldots, t-1, t+1, \ldots, t+N$, respectively, where N is a predetermined integer value. Thus, the sequence of words 104 received by the word prediction system 100 are words at positions t−N, ..., t−1, t+1, ..., t+N, in a particular sequence of words having an unknown word at position t. The word prediction system 100 uses the sequence of words 104 to predict an output, i.e., a vector of scores that includes a respective score for each word of the set of words that represents a predicted likelihood that the corresponding word will be found at position t in the sequence.

The word prediction system 100 includes an embedding function 106 and a classifier 110. The embedding function 106 receives a sequence of words and, in accordance with a set of embedding function parameters, applies a transformation to the words that maps the words into a continuous high-dimensional numeric representation. For example, the embedding function 106 can apply a transformation to the words 104 to map the words into a floating point representation 108. Embedding functions will be described in more detail below with reference to FIG. 2.

The classifier 110 receives the numeric representation generated by the embedding function 106 and predicts a value for each field of a word score vector in accordance with values of classifier parameters. Each of the fields in the word score vector corresponds to a respective word in the set of words. For example, the classifier 110 can generate a word score vector 112 from the floating point representation 108. The classifier 110 can be any multiclass or multilabel classifier, e.g., a multiclass logistic regression classifier, a multiclass support vector machine classifier, a Bayesian classifier, and so on. In some implementations, instead of the classifier 110, the concept term scoring system 100 can include a ranking function that orders the words based on the numeric representation generated by the embedding function 106, i.e., in order of predicted likelihood of being the word at position t. The ranking function may be, e.g., a hinge-loss ranking function, a pairwise ranking function, and so on. Once generated, the word score vectors can be stored in a predicted word store 114 or used for some immediate purpose.

Figure 2:
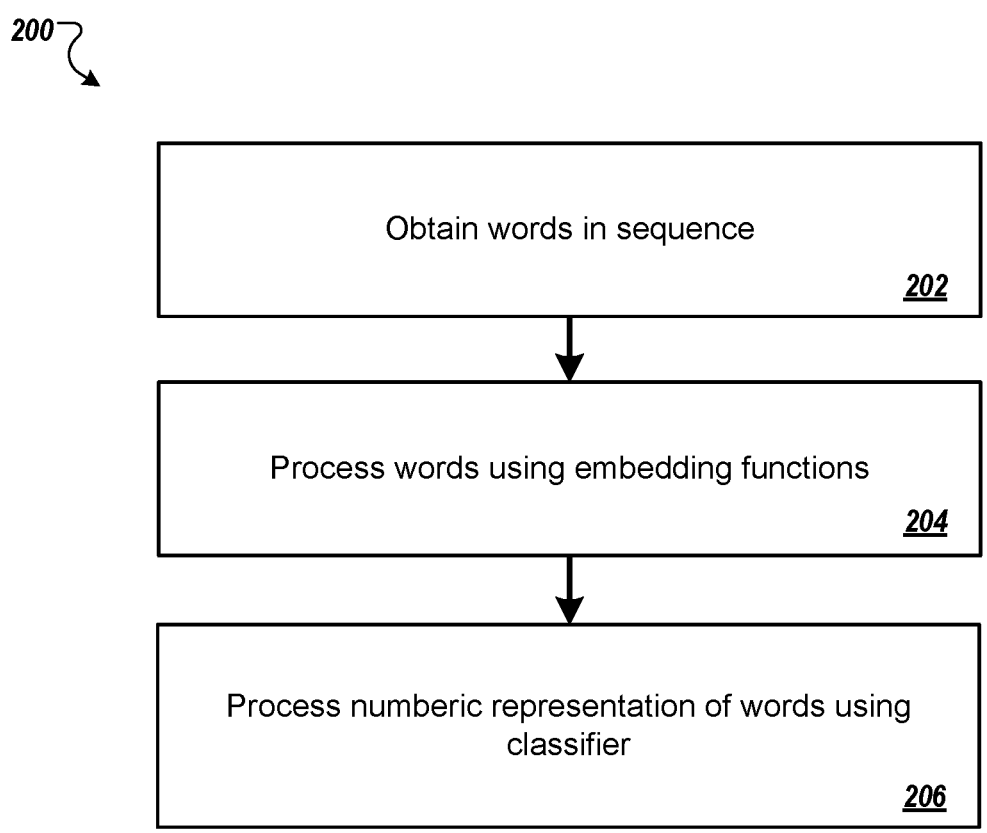
FIG. 2 is a flow diagram of an example process for predicting a word based on surrounding words.

FIG. 2 is a flow diagram of an example process 200 for predicting a word based on surrounding words. For convenience, the process 200 will be described as being performed by a system of one or more computers located in one or more locations. For example, a word prediction system, e.g., the word prediction system 200 of FIG. 2, appropriately programmed, can perform the process 200.

The system obtains a set of input words (step 202). The set of input words are words from a sequence of words that includes an unknown word whose value is to be predicted. That is, if the sequence includes an unknown word at position t, the set of input words may be the words at position t−N, ..., t−1, t+1, ..., and t+N in the sequence. In some implementations, the input words are tokenized before being received by the system, e.g., so that known compounds are treated as a single word by the system.

The system processes the words using an embedding function (step 204) to generate a numeric representation of the words.

For example, the embedding function may be a combining embedding function. A combining embedding function maps each word in the sequence of words to a respective continuous high-dimensional representation, e.g., to a respective high-dimensional vector of floating point numbers, based on current parameter values of the embedding function, e.g., as stored in a lookup table, and then merges the respective floating point vectors into a single merged vector. The combining embedding function can merge the respective floating point vectors using a linear function, e.g., a sum, average, or weighted linear combination of the respective floating point vectors, or using a nonlinear function, e.g., a component-wise maximum or a norm-constrained linear combination, for example. In order to identify the respective floating point vectors, the parallel embedding function may use a single lookup table or multiple different lookup tables. As a simplified example, for the ordered list {"Atlanta", "Hotel"}, the parallel embedding function may map "Atlanta" to a vector [0.1, 0.2, 0.3] and "Hotel" to [0.4, 0.5, 0.6], and then output the sum of the two vectors, i.e., [0.5, 0.7, 0.9].

The system processes the numeric representations using a classifier (step 206) to predict an output for each of a set of words. The classifier predicts the output based on values of a set of parameters and the numeric representation. The output for a given word is a prediction of the value of a variable that corresponds to the word, e.g., a score for the word that represents the predicted likelihood that the word is the unknown word at position t. In some implementations, the system can process the numeric representation of the input words using a ranking function instead of a classifier to predict a ranking of the words according to the predicted likelihood that each of the words is the unknown word in the sequence.

The process 200 can be performed to predict scores for an input for which the desired output is not known, i.e., for a sequence of words in which one word is not known. The process 200 can also be performed on inputs in a set of training data, i.e., a set of inputs for which the output that should be predicted by the system is known, in order to train the system, i.e., to determine optimal values for the parameters of the classifier and the deep network. For example, the process 200 can be performed repeatedly on inputs selected from a set of training data as part of a backpropagation training technique that determines optimal values for each of the parameters. Generally, the inputs in the set of training data are sequences of words in which every word in the sequence is known.

As part of the training process, if the label predicted by the classifier for a particular sequence of words in the set of training data is different from the known desired label for that particular sequence of words, i.e., the word scores generated by the classifier do not align with the actual value of the unknown word, the classifier will adjust its parameters so as to reduce the expected error on that particular input using conventional gradient based methods. Furthermore, as part of the backpropagation method, the classifier sends an error signal to the embedding function, which allows the embedding function to adjust its parameters through successive stages of backpropagation.

In some circumstances, e.g., for large sets of training data, the training process can be parallelized in any of a variety of ways. For example, the training process can be parallelized using one or more of the techniques for parallelizing the training of a machine learning model described in "Large Scale Distributed Deep Networks," Jeffrey Dean, et al., Neural Information Processing Systems Conference, 2012.

Figure 3:
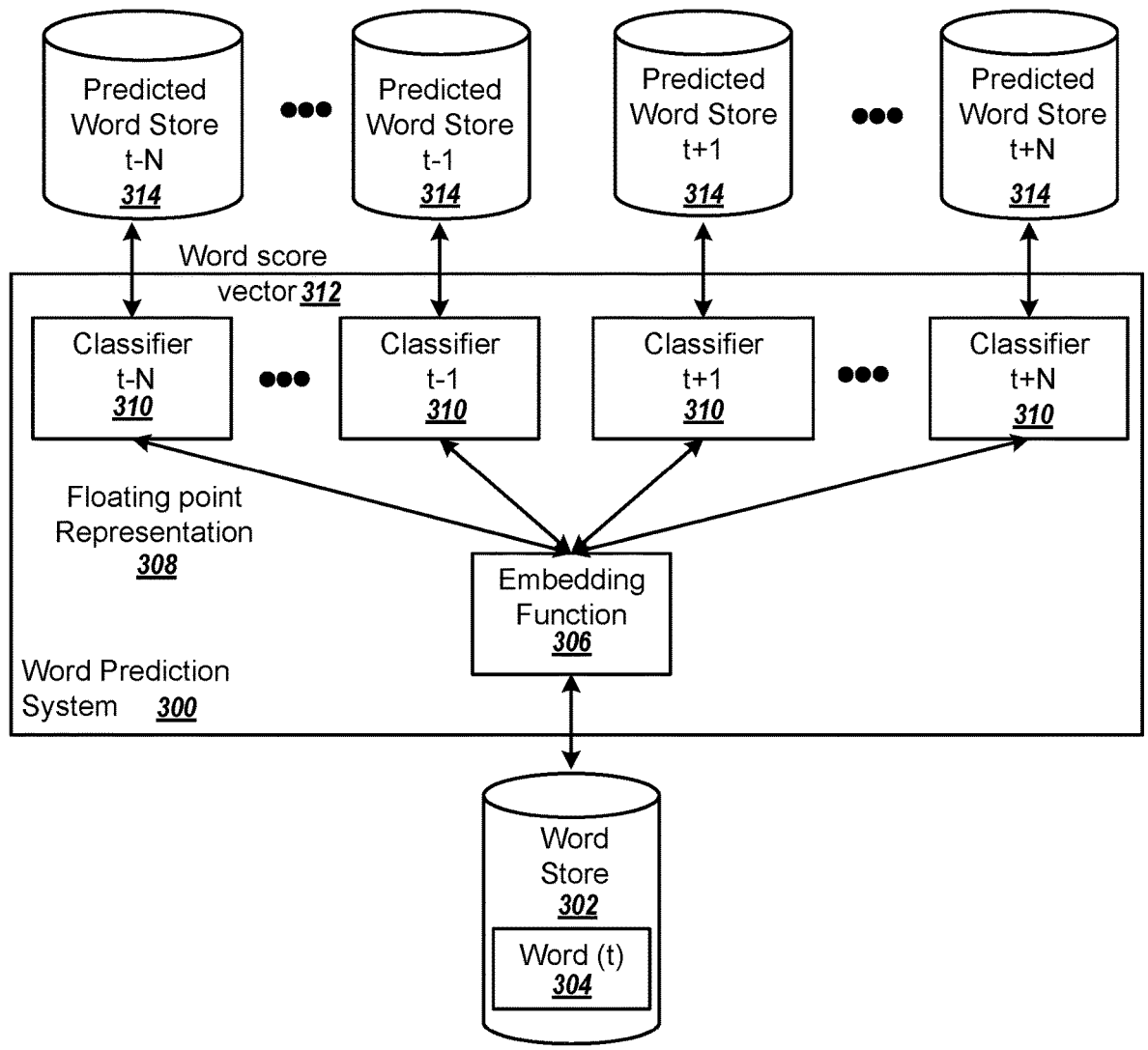
FIG. 3 is a block diagram of another example word prediction system.

FIG. 3 is a block diagram of another example word prediction system 300. The word prediction system 300 is an example of a system implemented as computer programs on one or more computers in one or more locations, in which the systems, components, and techniques described below can be implemented.

The word prediction system 300 receives an input and generates a predicted output based on the received input. In particular, the input is a word and the output is a respective score vector for each position surrounding the position of the input word in a sequence of words. In some implementations, input words are tokenized before being received by the system, e.g., so that the input word can be a known compound that is treated as a single word by the system. The score vector for a given position includes a respective score for each of a predetermined set of words. Each score is a prediction of how likely it is that the word is the word at that position in the sequence. For example, for a sequence of words $X_1 X_2 X_3$, where the word $X_2$ is known and the words $X_1$ and $X_3$ are not, the word prediction system 300 can receive as an input the word $X_2$ and, for each of the words $X_1$ and $X_3$, generate a score for each of the predetermined set of words that is a prediction of how likely it is that the corresponding word will be found at the corresponding position in the sequence relative to the input word, i.e., that the corresponding word is the unknown word $X_1$ or the unknown word $X_3$.

For example, the word prediction system 300 can receive an input word 304 from a word data store 302. The input word 304 is a word at position t in a sequence of words in which the words in the other positions in the sequence, i.e., the words at positions t–N, . . . , t–1, t+1, . . . , and t+N, are not known, i.e., are to be predicted by the word prediction system 300. The word prediction system 300 uses the input word 304 to predict an output, i.e., for each of the positions t–N, . . . , t–1, t+1, . . . , and t+N, the word prediction 300 generates a vector of scores that includes a respective score for each word of the set of words.

The word prediction system 300 includes an embedding function 306 and a set of classifiers 310. The embedding function 306 receives an input word and, in accordance with a set of embedding function parameters, applies a transformation to the word that maps the word into a continuous high-dimensional numeric representation. For example, the embedding function 306 can apply a transformation to the input word 304 to map the word into a floating point representation 308. Embedding functions will be described in more detail below with reference to FIG. 4.

Each of the classifiers 310 receives the numeric representation generated by the embedding function 306 and predicts a value for each field of a respective word score vector in accordance with values of a respective set of classifier parameters. Generally, each of the classifiers 310 will have different values of the classifier parameters. Each word score vector corresponds to a respective position in the sequence of words. For example, the word score vector 312 includes values for each of the predetermined set of words that is a prediction of how likely it is that the corresponding word is the word at position t–N in the sequence. The classifiers 310 can be any multiclass or multilabel classifier, e.g., a multiclass logistic regression classifier, a multiclass support vector machine classifier, a Bayesian classifier, and so on. In some implementations, instead of the classifiers 310, the concept term scoring system 300 can include ranking functions that each order the words based on the numeric representation generated by the embedding function 106, i.e., in order of predicted likelihood of being the word at the corresponding position. The ranking function may be, e.g., a hinge-loss ranking function, a pairwise ranking function, and so on.

Once generated, the word score vectors can be stored in a respective predicted word store 314 or used for some immediate purpose.

Figure 4:
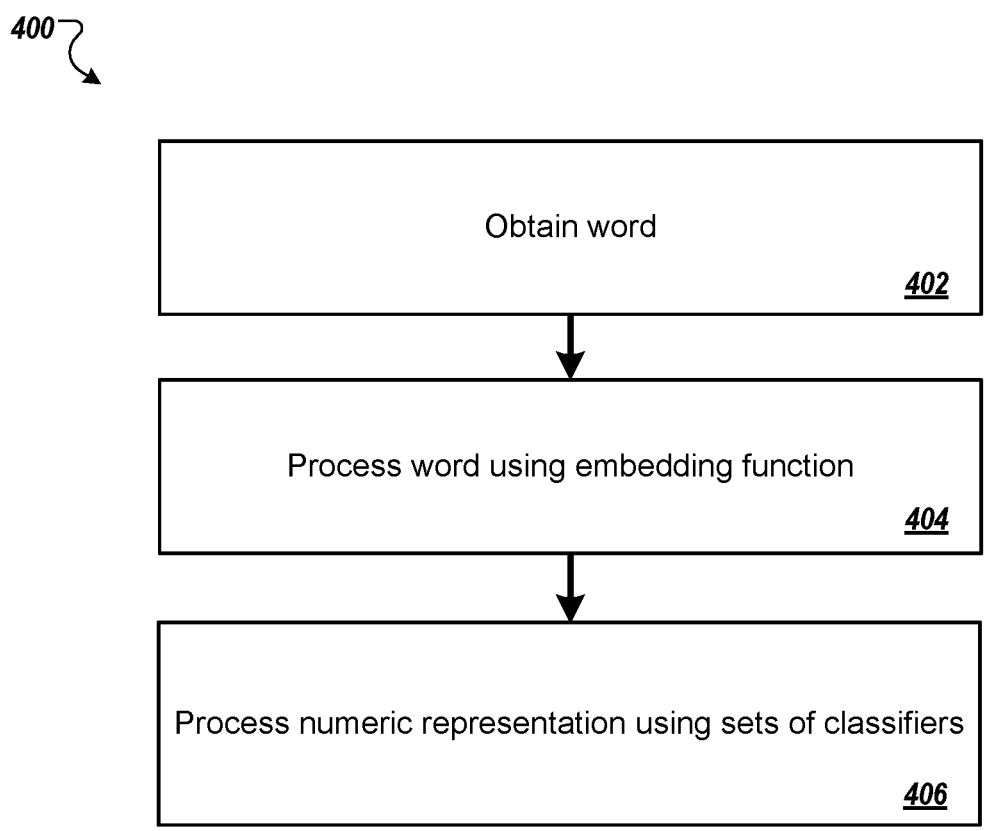
FIG. 4 is a flow diagram of an example process for predicting words that surround a word in a sequence of words.

FIG. 4 is a flow diagram of an example process 400 for predicting words that surround a known word in a sequence of words. For convenience, the process 400 will be described as being performed by a system of one or more computers located in one or more locations. For example, a word prediction system, e.g., the word prediction system 300 of FIG. 3, appropriately programmed, can perform the process 400.

The system obtains an input word (step 402). The input word is a word that is at position t in a sequence of words. In some implementations, input words are tokenized before being received by the system, e.g., so that the input word can be a known compound that is treated as a single word by the system.

The system processes the word using an embedding function (step 404) to generate a numeric representation of the word in a high-dimensional space. The embedding function maps the word to a continuous high-dimensional representation, e.g., to a high-dimensional vector of floating point numbers. For example, the embedding function may map the word 'cat' to a vector [0.1, 0.5, 0.2] and the word 'tablet' to a vector [0.3, 0.9, 0.0], based on current parameter values of the embedding function, e.g., as stored in a lookup table.

The system processes the numeric representation using each of a set of classifiers (step 406) to predict an output for each of a set of positions surrounding position t, i.e., the words in the positions t–1V, . . . , t–1, t+1, . . . , and t+N in the sequence. Each classifier predicts an output for a respective position in the sequence based on values of a set of parameters and the numeric representation. The output for a given position in the sequence is a set of predicted values of variables that each correspond to a respective word from the pre-determined set of words, e.g., a score for the word that represents the predicted likelihood that the word is the word in the position. In some implementations, the system can process the numeric representation of the input words using ranking functions instead of classifiers to predict a ranking of the words according to the predicted likelihood that each of the words is at the corresponding position in the sequence.

Like the process 200, the process 400 can be performed on inputs for which the desired output is not known, i.e., on an input word for which the surrounding words are not known, or on inputs from a set of training data, i.e., on an input word for which the surrounding words are known, as part of a training process.

As part of the training process, if the label predicted by one of the classifiers for a particular input word in the set of training data is different from the known desired label for that particular word, i.e., the word scores generated by the classifier do not align with the value of the word in the corresponding position, the classifier will adjust its parameters so as to reduce the expected error on that particular input using conventional gradient based methods. Furthermore, as part of the backpropagation method, the classifier sends an error signal to the embedding function, which allows the embedding function to adjust its parameters through successive stages of backpropagation. As described above with reference to FIG. 2, the training process can be parallelized in any of a variety of ways.

Once the word prediction system 100 and the word prediction system 300 have been trained and the parameters of the embedding function 106 and the embedding function 306 have been adjusted, the numeric representations produced by the embedding functions can be used for a variety of purposes other than as input to a classifier. For example, by training the word prediction system 100 or the word prediction system 300 to generate trained values of embedding function parameters for the embedding function 106 or the embedding function 306, e.g., as described below with reference to FIG. 5, the numeric representations produced by the embedding functions can encode many useful regularities. That is, the positions of the representations in the high-dimensional space can reflect syntactic similarities, e.g., showing that, by virtue of the positions of the numerical representations of each word in the space, words that are similar to the word "small" include the words "smaller," "tiny," smallest," and so on, and semantic similarities, e.g., showing that the word "queen" is similar to the words "king" and "prince." Furthermore, because of the encoded regularities, the numeric representations may show that the word "king" is similar to the word "queen" in the same sense as the word "prince" is similar to the word "princess," and alternatively that the word "king" is similar to the word "prince" as the word "queen" is similar to the word "princess." Advantageously, operations can be performed on the numeric representations to identify words that have a desired relationship to other words. In particular, vector subtraction and vector addition operations performed on floating point vectors generated by an embedding function in accordance with trained values of the parameters of the embedding function can be used to determine relationships between words. For example, in order to identify a word that has a similar relationship to a word A as a word B has to a word C, the following operation may be performed on the vectors representing words A, B, and C: vector(A)−vector(B)+vector(C). For example, the operation vector("King")−vector("Man")+vector("Woman") may result in a vector that is closest to the vector representation of the word "Queen."

Figure 5:
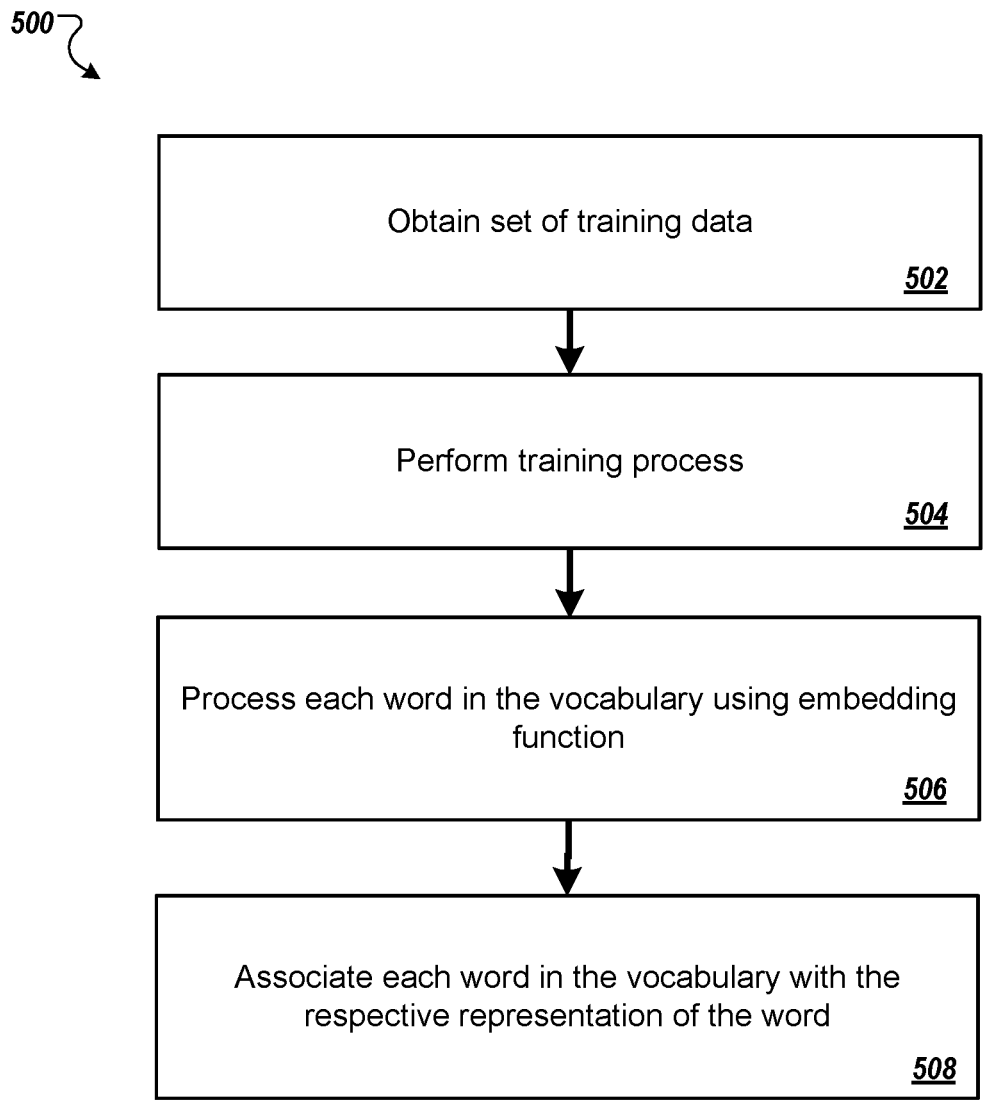
FIG. 5 is a flow diagram of an example process for generating numeric representations in a high-dimensional space for a vocabulary of words.

FIG. 5 is a flow diagram of an example process 500 for generating numeric representations in a high-dimensional space for a vocabulary of words. For convenience, the process 500 will be described as being performed by a system of one or more computers located in one or more locations. For example, a word prediction system, e.g., the word prediction system 100 of FIG. 1 or the word prediction system 300 of FIG. 3, appropriately programmed, can perform the process 500.

The system obtains a set of training data (step 502). The set of training data includes sequences of known words, e.g., sentences or phrases. In some implementations, the training data is tokenized before being received by the system, e.g., so that known compounds are treated as a single word by the system.

The system performs a training process to train one or more classifiers and an embedding function (step 504), e.g., the embedding function 106 and the classifier 110 of FIG. 1 or the embedding function 306 and the set of classifiers 310 of FIG. 3. The training process can be performed repeatedly on inputs selected from the set of training data as part of a backpropagation training technique that determines trained values for each of the parameters of the classifier.

As part of the training process, if the label predicted by a classifier for a particular sequence of words in the set of training data is different from the known desired label for that particular sequence of words, i.e., the word scores generated by the classifier do not align with the actual value of the unknown word or words in the sequence, the classifier will adjust its parameters so as to reduce the expected error on that particular input using conventional gradient based methods. Furthermore, as part of the backpropagation method, the classifier sends an error signal to the embedding function, which allows the embedding function to adjust its parameters through successive stages of backpropagation.

The system processes each word in the vocabulary of words using the embedding function (step 506) in accordance with the trained embedding function parameters of the embedding function to generate a respective continuous numeric representation of each of the words in the high-dimensional space. For example, the numeric representations may be floating point vectors, i.e., high-dimensional vectors of floating point values.

The system associates each word in the vocabulary with the respective numeric representation of the word (step 508). The system can then store the associations, e.g., as a data set of words and their associated representations. As described above, because the numeric representations were generated in accordance with the trained parameters of the embedding function, the numeric representations may reflect certain semantic similarities between the words that they represent. That is, positions of the representations in the high-dimensional space will reflect semantic and syntactic similarities between the represented words.

Additionally, the predictions generated by the system 100 or the system 300, i.e., predictions of likelihoods of words being found at particular positions in sequences of words, can be used in any of a variety of ways. For example, the system 100 or the system 300, once trained, can be used to predict missing words at various positions in sentences. As another example, the system 100 or the system 300 can be used by a question/answer system to predict the answer to a known question or to predict the question to a known answer. That is, the system 100 or the system 300 can be trained on known question-answer pairs, and can then be used to predict a question if all or part of an answer is known or an answer if all or part of a question is known.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   obtaining a set of words that comprises a plurality of words;
   obtaining a respective numeric representation for each of the plurality of words; and merging the respective numeric representations to generate a merged numeric representation for the plurality of words, wherein a position of the merged numeric representation in a high-dimensional space reflects semantic or syntactic similarities between words represented by the respective numeric representations, wherein merging the respective numeric representations to generate the merged numeric representation for the plurality of words comprises merging the respective numeric representations using a linear function or a nonlinear function.

2. The method of claim 1, wherein the numeric representations have been generated by:

obtaining a set of training data, wherein the set of training data comprises sequences of words;

training a plurality of classifiers and an embedding function on the set of training data, wherein the embedding function receives an input word and maps the input word to the numeric representation in a high-dimensional space in accordance with a set of embedding function parameters, wherein each of the classifiers corresponds to a respective position surrounding the input word in a sequence of words, and wherein each of the classifiers processes the numeric representation of the input word to generate a respective word score for each word in a pre-determined set of words, wherein each of the respective word scores represents a predicted likelihood that a corresponding word will be found in the corresponding position relative to the input word, and wherein training the embedding function comprises determining trained values of the embedding function parameters;

processing each word in a vocabulary using the embedding function in accordance with the trained values of the embedding function parameters to generate the respective numeric representation of each word in the vocabulary;

associating each word in the vocabulary with the respective numeric representation of the word in the high-dimensional space; and storing the data set on a one or more non-transitory computer storage media.

3. The method of claim 1, wherein the numeric representations are continuous representations represented using floating-point numbers.

4. The method of claim 1, wherein positions of numeric representations in a high-dimensional space reflect semantic similarities between words represented by the numeric representations.

5. The method of claim 1, wherein positions of numeric representations in a high-dimensional space reflect syntactic similarities between words represented by the numeric representations.

6. The method of claim 2, wherein the embedding function maps each of the plurality of words to a respective floating point vector and outputs a single merged vector that is a combination of the respective floating point vectors.

7. The method of claim 2, wherein training the classifier and the embedding function comprises preforming a back-propagation training technique to determine the trained values of the embedding function parameters.

8. The method of claim 2, wherein a dimensionality of the high-dimensional space is on the order of one thousand.

9. The method of claim 2, wherein the classifier has a set of classifier parameters, and wherein training the plurality of classifiers and the embedding function on the set of training data comprises determining trained values of the set of classifier parameters.

10. The method of claim 1, further comprising identifying words in the plurality of words that have a desired relationship to other words using the merged numeric representation.

11. One or more non-transitory computer storage media storing instructions that when executed by one or more computers cause the one or more computers to perform operations comprising:

obtaining a set of words that comprises a plurality of words;

obtaining a respective numeric representation for each of the plurality of words; and merging the respective numeric representations to generate a merged numeric representation for the plurality of words, wherein a position of the merged numeric representation in a high-dimensional space reflects semantic or syntactic similarities between words represented by the respective numeric representations, wherein merging the respective numeric representations to generate the merged numeric representation for the plurality of words comprises merging the respective numeric representations using a linear function or a non-linear function.

12. The one or more non-transitory computer storage media of claim 11, wherein the numeric representations have been generated by:

obtaining a set of training data, wherein the set of training data comprises sequences of words;

training a plurality of classifiers and an embedding function on the set of training data, wherein the embedding function receives an input word and maps the input word to the numeric representation in a high-dimensional space in accordance with a set of embedding function parameters, wherein each of the classifiers corresponds to a respective position surrounding the input word in a sequence of words, and wherein each of the classifiers processes the numeric representation of the input word to generate a respective word score for each word in a pre-determined set of words, wherein each of the respective word scores represents a predicted likelihood that a corresponding word will be found in the corresponding position relative to the input word, and wherein training the embedding function comprises determining trained values of the embedding function parameters;

processing each word in a vocabulary using the embedding function in accordance with the trained values of the embedding function parameters to generate the respective numeric representation of each word in the vocabulary;

associating each word in the vocabulary with the respective numeric representation of the word in the high-dimensional space; and storing the data set on a one or more non-transitory computer storage media.

13. The one or more non-transitory computer storage media of claim 11, wherein the numeric representations are continuous representations represented using floating-point numbers.

14. A system comprising:

one or more computers; and one or more storage devices, wherein the one or more storage devices store instructions that, when executed by one or more computers, cause one or more computers to perform operations comprising:

obtaining a set of words that comprises a plurality of words;

obtaining a respective numeric representation for each of the plurality of words; and merging the respective numeric representations to generate a merged numeric representation for the plurality of words, wherein a position of the merged numeric representation in a high-dimensional space reflects semantic or syntactic similarities between words represented by the respective numeric representations, wherein merging the respective numeric representations to generate the merged numeric representation for the plurality of words comprises merging the respective numeric representations using a linear function or a non-linear function.

15. The system of claim 14, wherein the numeric representations have been generated by:

obtaining a set of training data, wherein the set of training data comprises sequences of words;

training a plurality of classifiers and an embedding function on the set of training data, wherein the embedding function receives an input word and maps the input word to the numeric representation in a high-dimensional space in accordance with a set of embedding function parameters, wherein each of the classifiers corresponds to a respective position surrounding the input word in a sequence of words, and wherein each of the classifiers processes the numeric representation of the input word to generate a respective word score for each word in a pre-determined set of words, wherein each of the respective word scores represents a predicted likelihood that a corresponding word will be found in the corresponding position relative to the input word, and wherein training the embedding function comprises determining trained values of the embedding function parameters;

processing each word in a vocabulary using the embedding function in accordance with the trained values of the embedding function parameters to generate the respective numeric representation of each word in the vocabulary;

associating each word in the vocabulary with the respective numeric representation of the word in the high-dimensional space; and storing the data set on a one or more non-transitory computer storage media.

16. The system of claim 14, wherein the numeric representations are continuous representations represented using floating-point numbers.

* * * * *

UNITED STATES PATENT AND TRADEMARK OFFICE
CERTIFICATE OF CORRECTION

| | | |
|---|---|---|
| PATENT NO. | : 11,809,824 B1 | Page 1 of 1 |
| APPLICATION NO. | : 17/175550 | |
| DATED | : November 7, 2023 | |
| INVENTOR(S) | : Mikolov et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 372 days.

Signed and Sealed this
Twenty-sixth Day of August, 2025

Coke Morgan Stewart
*Acting Director of the United States Patent and Trademark Office*